(12) United States Patent
Inohiza

(10) Patent No.: US 11,483,730 B2
(45) Date of Patent: Oct. 25, 2022

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Hirohiko Inohiza, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 16/717,322

(22) Filed: Dec. 17, 2019

(65) Prior Publication Data

US 2020/0213893 A1 Jul. 2, 2020

(30) Foreign Application Priority Data

Dec. 26, 2018 (JP) .............................. JP2018-242177

(51) Int. Cl.
| | |
|---|---|
| H04W 28/02 | (2009.01) |
| H04W 68/00 | (2009.01) |
| H04L 1/00 | (2006.01) |
| H04B 17/336 | (2015.01) |
| H04B 17/318 | (2015.01) |

(52) U.S. Cl.
CPC ...... *H04W 28/0257* (2013.01); *H04B 17/318* (2015.01); *H04B 17/336* (2015.01); *H04L 1/003* (2013.01); *H04W 28/0268* (2013.01); *H04W 28/0278* (2013.01); *H04W 68/005* (2013.01)

(58) Field of Classification Search
None
See application file for complete search history.

(56) References Cited

U.S. PATENT DOCUMENTS

| | | | |
|---|---|---|---|
| 11,178,568 B2 * | 11/2021 | Park | H04L 1/1614 |
| 2017/0055284 A1 * | 2/2017 | Min | H04L 5/14 |
| 2017/0164351 A1 * | 6/2017 | Ghosh | H04W 72/0446 |
| 2017/0367078 A1 | 12/2017 | Chun | |
| 2018/0263044 A1 * | 9/2018 | Zhou | H04W 72/12 |
| 2019/0230674 A1 * | 7/2019 | Cheng | H04W 72/044 |
| 2020/0029350 A1 * | 1/2020 | Asterjadhi | H04W 28/18 |
| 2020/0137772 A1 * | 4/2020 | Inohiza | H04W 72/1268 |

* cited by examiner

*Primary Examiner* — Anh Vu H Ly
(74) *Attorney, Agent, or Firm* — Canon U.S.A., Inc. IP Division

(57) ABSTRACT

When a plurality of other communication apparatuses parallelly communicates with a first communication apparatus by using a frequency band assigned by the first communication apparatus to each of the plurality of other communication apparatuses including a second communication apparatus, a transmission rate when communicating with the second communication apparatus is set based on a communication time in communication with a third communication apparatus included in the plurality of other communication apparatuses.

13 Claims, 12 Drawing Sheets

| AID | TRANSMISSION DATA AMOUNT | MCS index | Nss | COMMUNICATION TIME (ms) |
|---|---|---|---|---|
| 1 | 1 | 1 | 1 | 16 |
| 2 | 1 | 3 | 2 | 4 |

1000

| AID | TRANSMISSION DATA AMOUNT | MCS index | Nss | COMMUNICATION TIME (ms) |
|---|---|---|---|---|
| 1 | 1 | 1 | 1 | 16 |
| 2 | 1 | 1 | 1 | 16 |

| 701 | 702 | 703 | 704 | 705 |

| AID | TRANSMISSION DATA AMOUNT | MCS index | Nss | COMMUNICATION TIME (ms) |
|---|---|---|---|---|
| 1 | 1 | 1 | 1 | 16 |
| 2 | 1 | 3 | 2 | 4 |

700

| AID | TRANSMISSION DATA AMOUNT | MCS index | Nss | COMMUNICATION TIME (ms) |
|---|---|---|---|---|
| 1 | 1 | 1 | 1 | 16 |
| 2 | 1 | 1 | 1 | 16 |

| AID | TRANSMISSION DATA AMOUNT | MCS index | Nss | COMMUNICATION TIME (ms) |
|---|---|---|---|---|
| 1 | 1 | 1 | 1 | 16 |
| 2 | 1 | 3 | 2 | 4 |

*1000*

| AID | TRANSMISSION DATA AMOUNT | MCS index | Nss | COMMUNICATION TIME (ms) |
|---|---|---|---|---|
| 1 | 1 | 1 | 1 | 16 |
| 2 | 1 | 1 | 1 | 16 |

*1010*

COMMUNICATION APPARATUS, COMMUNICATION MELHOD, AND STORAGE MEDIUM

BACKGROUND

Field of the Disclosure

The present disclosure relates to a communication apparatus communicating data through Orthogonal Frequency Division Multiple Access (OFDMA) communication.

Description of the Related Art

The Institute of Electrical and Electronics Engineers (IEEE) is studying IEEE802.11ax as a High Efficiency (HE) next-generation wireless local area network (LAN) standard. IEEE802.11ax proposes the adoption of Orthogonal Frequency Division Multiple Access (OFDMA) to improve the use efficiency of frequencies. OFDMA enables the structure of a frequency channel conventionally used in units of a 20-MHz frequency bandwidth to be assigned to a plurality of terminals in units of a narrower frequency bandwidth. The OFDMA is a Multi User (MU) communication method for multiplexing signals of a plurality of users.

In IEEE802.11ax, a control station (hereinafter referred to as an Access Point (AP)) assigns at least a part of the 20-MHz frequency bandwidth to up to nine terminal stations (hereinafter referred to as Stations (STAs)) through OFDMA. For example, when the number of STAs is 1, one STA may be assigned the entire range of the 20-MHz frequency bandwidth. On the other hand, when the number of STAs is 2 or more, each STA is assigned a non-overlapping partial band (Resource Unit (RU)) in the 20-MHz frequency bandwidth.

United States Patent Application Publication 2017/0367078 discusses a technique used when transmitting data from an AP to a plurality of STAs through OFDMA. The technique equalizes the communication time for each STA by adding padding data to other data according to data with the maximum communication time.

In a case where padding data is added to data with a short communication time according to data with a long communication time as discussed in United States Patent Application Publication 2017/0367078, empty data will be communicated for the communication time corresponding to the padding data since the padding data is meaningless as a data content. Accordingly, the communication apparatus will waste a communication band since it communicates empty data as padding data.

SUMMARY

Some embodiments are directed to a communication apparatus capable of effectively using a communication band when the communication apparatus communicates in parallel with a plurality of other communication apparatuses by using a frequency band assigned to each of the plurality of other communication apparatuses.

According to an aspect of some embodiments, a communication apparatus includes a communication unit configured to communicate with a plurality of other communication apparatuses by using a frequency band assigned to each of the plurality of other communication apparatuses, a reception unit configured to receive a first notification frame for notifying the communication apparatus of a data amount of data stored as data to be transmitted from each of the plurality of other communication apparatuses to the communication apparatus, a determination unit configured to determine a first communication time based on a data amount of first data notified of by the first notification frame received by the reception unit from a first other communication apparatus included in the plurality of other communication apparatuses, a setting unit configured to, based on the first communication time determined by the determination unit, set a first transmission rate in communicating second data with a second other communication apparatus included in the plurality of other communication apparatuses, via the communication unit, and a control unit configured to, in a case of parallelly communicating with the plurality of other communication apparatuses including the first and the second other communication apparatuses via the communication unit, control reception of the second data to be transmitted at the first transmission rate set by the setting unit from the second other communication apparatus.

According to another aspect of some embodiments, a communication apparatus includes a transmission unit configured to transmit first data to a first other communication apparatus when the communication apparatus and a second other communication apparatus assigned a part of a frequency band by the first other communication apparatus parallelly communicate with the first other communication apparatus, and a control unit configured to, when the transmission unit transmits the first data to the first other communication apparatus, control transmission of the first data at the first transmission rate set by the first other communication apparatus based on a communication time for second data to be communicated with the first other communication apparatus by the second other communication apparatus.

Further features of various embodiments will become apparent from the following description of exemplary embodiments with reference to the attached drawings.

BRIEF DESCRIPTION OF THE DRAWINGS

FIG. 7 are tables illustrating examples of Station (STA) management information used in Downlink Orthogonal Frequency Division Multiple Access (DL-OFDMA) communication stored in the communication apparatus.

FIG. 10 are tables illustrating examples of STA management information used in Uplink Orthogonal Frequency Division Multiple Access (UL-OFDMA) communication stored in the communication apparatus.

DESCRIPTION OF THE EMBODIMENTS

Exemplary embodiments will be described in detail below with reference to the accompanying drawings. Configurations described in the following exemplary embodiments are to be considered as illustrative, and some embodiments are not limited to the illustrated configurations.

Figure 1:
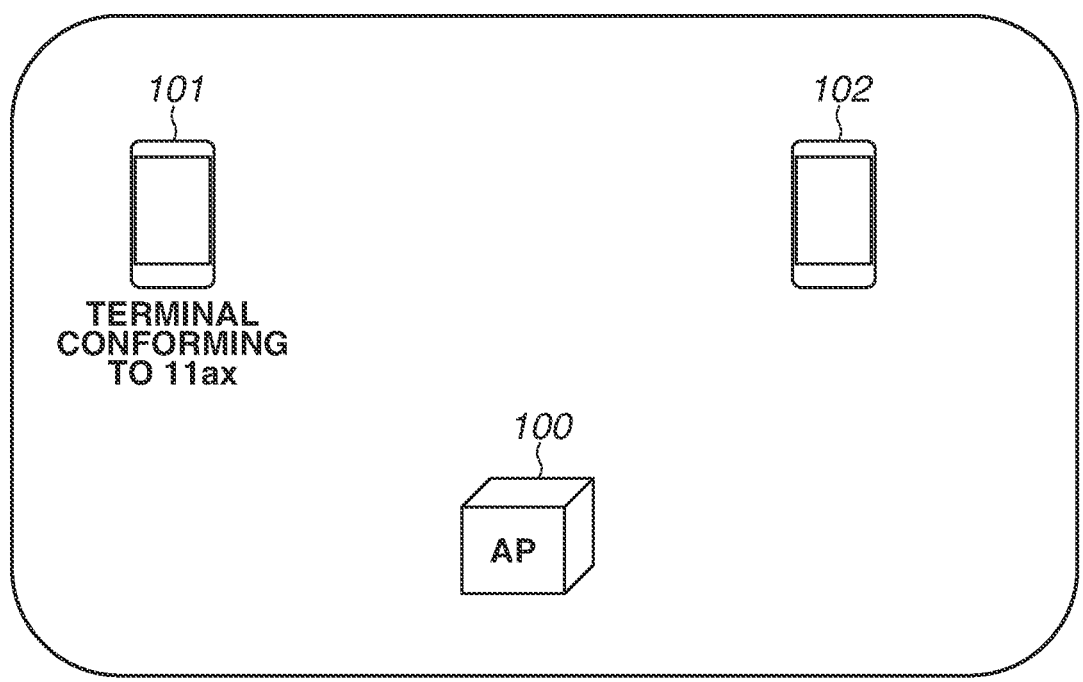
FIG. 1 is a diagram illustrating a configuration of a network in which a communication apparatus participates.

FIG. 1 illustrates a configuration of a network in which a communication apparatus 100 according to an exemplary embodiment participates. The communication apparatus 100 is a control station (Access Point (AP)) having a role of building a network. Communication apparatuses 101 and 102 are terminal stations (Stations (STAs)) having a role of participating in the network built by the AP. Each communication apparatus supports the IEEE (Institute of Electrical and Electronics Engineers) 802.11ax standard and can perform Orthogonal Frequency Division Multiple Access (OFDMA) communication conforming to the IEEE802.11ax standard. OFDMA communication is Multi User (MU) communication for multiplexing signals of a plurality of users. In OFDMA communication, carrier waves of STAs assigned divided frequency bands are orthogonal to each other. Therefore, an AP can parallelly communicate with a plurality of STAs.

In OFDMA communication conforming to the IEEE802.11ax standard, the communication apparatus 100 has a role of assigning a frequency band to the communication apparatuses 101 and 102 as STAs. When the communication apparatus 100 performs Downlink (DL)-OFDMA communication for transmitting data from an AP to STAs, the communication apparatus 100 calculates the maximum communication time based on the data amount of data addressed to each STA stored in the communication apparatus 100 and the transmission rate in communication with each of STAs (communication apparatuses 101 and 102). The communication apparatus 100 notifies each STA of the calculated maximum communication time and the frequency band assigned to each STA, through High Efficiency (HE) Preamble in HE MU Physical Layer Convergence Protocol (PLCP) Protocol Data Unit (PPDU). HE MU PPDU is a frame conforming to the IEEE802.11ax standard. The communication apparatus 100 transmits data to each STA for the calculated communication time by using the assigned frequency band. In this case, the communication apparatus 100 adds padding data as empty data to data addressed to an STA having a shorter communication time than the calculated maximum communication time and transmits the data to the STA, thus transmitting data for the maximum communication time to the STA.

In Uplink (UL)-OFDMA communication for transmitting data from STAs to an AP, the communication apparatus 100 first transmits Buffer Status Report (BSR) Poll as a request frame to each STA to request it to notify the communication apparatus 100 of the data amount of data stored in each STA. Upon reception of the request frame, each STA transmits a Buffer BSR Frame as a response to the request frame to the communication apparatus 100 to notify the communication apparatus 100 of the data amount of data addressed to the communication apparatus 100 stored in each STA. The communication apparatus 100 acquires the data amount of data addressed to the AP stored in each STA from the received BSR Frame and calculates the maximum communication time based on the transmission rate in communication with each STA. The communication apparatus 100 notifies each STA of the calculated maximum communication time and the frequency band assigned to each STA, through Trigger Frame (TF). TF is a frame conforming to the IEEE802.11ax standard. Upon reception of TF, each STA transmits data to the communication apparatus 100 for the communication time notified of by TF, by using the assigned frequency band. In this case, a STA that transmits data in a communication time shorter than the communication time notified of by TF adds padding data to data addressed to the communication apparatus 100 and transmits the data thereto, thus transmitting data for the notified communication time to the communication apparatus 100. BSR Poll and BSR Frame are frames conforming to the IEEE802.11ax standard.

The transmission rate in data communication between the AP and each STA is determined based on Modulation and Coding Scheme (MCS) and Number of Spatial Stream (Nss) used in data communication. MCS refers to a coding rate and a modulation method. Nss refers to the number of spatial streams in Multiple-Input and Multiple-Output (MIMO) communication. When communicating data, a modulation method that can transmit a smaller amount of information with one symbol (signal) provides a lower transmission rate. In addition, a lower coding rate provides a lower transmission rate. In addition, a smaller number of spatial streams provides a lower transmission rate. MCS and Nss that decrease the transmission rate provide a longer communication time and a higher resistance to error than MCS and Nss that increase the transmission rate. If MCS and/or Nss are changed, the transmission rate is also changed. More specifically, changing or setting the transmission rate means changing or setting MCS and/or Nss.

Although specific examples of the communication apparatus 100 include a wireless LAN router and a personal computer (PC), some embodiments are not limited thereto. The communication apparatus 100 may be any communication apparatus capable of performing OFDMA communication with other communication apparatuses and acquiring the data amount of data to be communicated with other communication apparatuses.

Although specific examples of the communication apparatuses 101 and 102 include cameras, tablet computers, smart phones, PCs, portable phones, and video cameras, some embodiments are not limited thereto. The communication apparatuses 101 and 102 are only required to be communication apparatuses capable of performing OFDMA communication with other communication apparatuses. The network illustrated in FIG. 1 includes three communication apparatuses, but the network may include two, or four or more communication apparatuses.

Although, in the present exemplary embodiment, each apparatus illustrated in FIG. 1 performs wireless communication conforming to the IEEE802.11ax standard, each apparatus may also perform wireless communication conforming to the IEEE802.11 ac standard and other IEEE802.11 series standards. Each communication apparatus illustrated in FIG. 1 may perform wireless communication conforming to Bluetooth®, Near field Communication (NFC), Ultra Wide Band (UWB), ZigBee, Multi Band OFDM Alliance (MBOA), and other wireless communication methods in addition to or instead of the above-described standards. UWB includes wireless USB, wireless 1394, and WiNET. Communication methods conforming to a wired communication method, such as a wired LAN, may also be performed.

Figure 2:
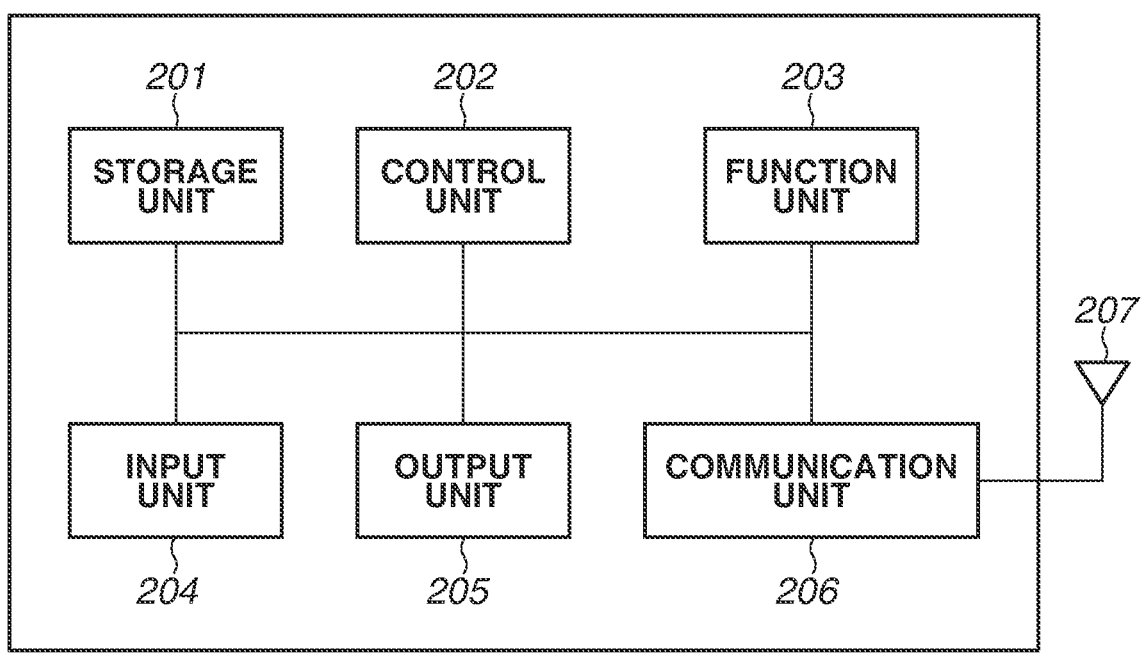
FIG. 2 is a block diagram illustrating a hardware configuration of the communication apparatus.

FIG. 2 is a block diagram illustrating a hardware configuration of the communication apparatus 100.

The communication apparatus 100 includes a storage unit 201, a control unit 202, a function unit 203, an input unit 204, an output unit 205, a communication unit 206, and an antenna 207.

The storage unit 201 includes at least one memory, such as a read only memory (ROM) and a random access memory (RAM), and stores computer programs for executing various operations (described below) and various types of information including communication parameters for wireless communication. The storage unit 201 may include, other than the ROM and the RAM, a storage medium, such as a flexible disk, hard disk, optical disk, magneto-optical (MO) disk, compact disc read only memory (CD-ROM), compact disc recordable (CD-R), magnetic tape, nonvolatile memory card, and digital versatile disc (DVD). In addition, the storage unit 201 may include a plurality of memories.

The control unit 202 includes at least one processor such, as a central processing unit (CPU) or a microprocessing unit (MPU), for executing computer programs stored in the storage unit 201 to control the entire communication apparatus 100. The control unit 202 may control the entire communication apparatus 100 by the collaboration of computer programs and an Operating System (OS) stored in the storage unit 201. The control unit 202 may include a plurality of processors, such as a multi-core processor, for controlling the entire communication apparatus 100.

The control unit 202 controls the function unit 203 to perform image capturing, printing, projection, and other predetermined processing. The function unit 203 is a hardware component for enabling the communication apparatus 100 to perform predetermined processing. For example, when the communication apparatus 100 is a camera, the function unit 203 is an imaging unit for performing image capture processing. For example, when the communication apparatus 100 is a printer, the function unit 203 is a printing unit for performing print processing. For example, when the communication apparatus 100 is a projector, the function unit 203 is a projection unit for performing projection processing. Data processed by the function unit 203 may be data stored in the storage unit 201 or data received from other communication apparatuses via the communication unit 206 (described below).

The input unit 204 receives various operations from a user. The output unit 205 performs various output operations to the user via a monitor screen and a speaker. Outputs by the output unit 205 may include display on the monitor screen, audio output from the speaker, and vibration output. The monitor screen output by the output unit 205 is the monitor screen included in the communication apparatus 100, or may be the monitor screen of other apparatus connected to the communication apparatus 100. Both the input unit 204 and the output unit 205 may be implemented as one module, such as a touch panel. Each of the input unit 204 and the output unit 205 may be integrally formed with or separately formed from the communication apparatus 100. The output unit 205 implements display on the screen, audio output to the speaker, and vibration output to implement the functions as a notification unit for notifying the user of information. The communication apparatus 100 may be provided with, for example, hardware keys and a touch screen integrally formed with the communication apparatus 100 as the input unit 204, or provided with a remote control separate from the communication apparatus 100. The communication apparatus 100 may also be provided with, for example, a monitor screen and a light source integrally formed with the communication apparatus 100 as the output unit 205, or provided with a display and a speaker separate from the communication apparatus 100.

The communication unit 206 controls wireless communication conforming to the IEEE802.11ax standard. The communication unit 206 may control wireless communication conforming to the IEEE802.11ax standard and other IEEE802.11 series standards, and control wired communication, such as a wired LAN. The communication unit 206 controls the antenna 207 to transmit and receive wireless signals for wireless communication. The communication apparatus 100 may perform NFC— and Bluetooth-based wireless communication in addition to wireless communication conforming to the IEEE802.11ax standard. When the communication apparatus 100 is capable of performing wireless communication conforming to a plurality of wireless communication standards, the communication apparatus 100 may include the communication units 206 and the antennas 207 conforming to respective wireless communication standards. The communication apparatus 100 communicates such contents as image data, document data, and video data with the communication apparatuses 101 and 102 via the communication unit 206.

The communication apparatuses 101 and 102 have a similar hardware configuration to that of the communication apparatus 100.

Figure 3:
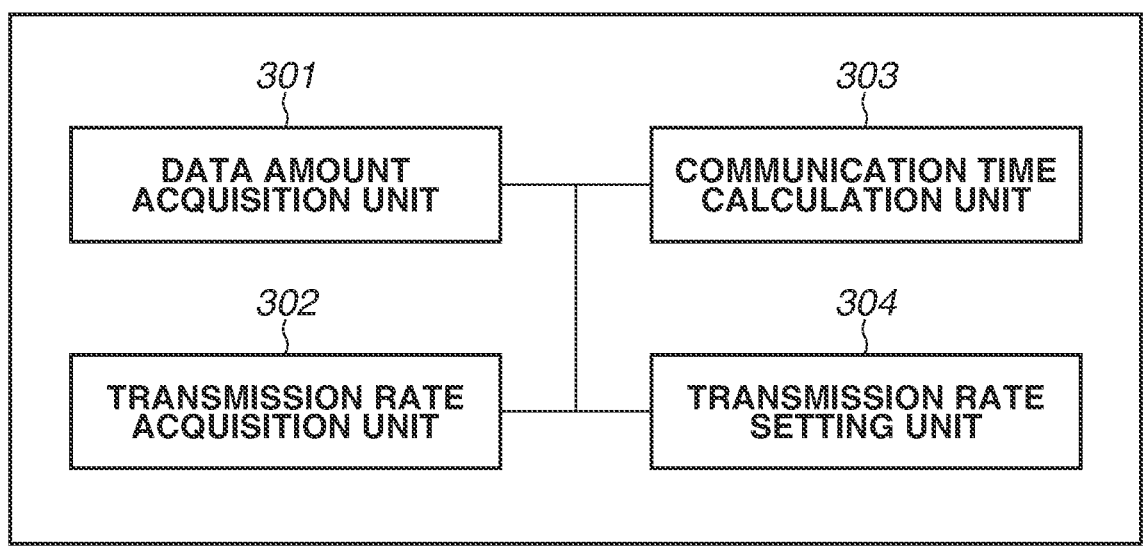
FIG. 3 is a block diagram illustrating a functional configuration of the communication apparatus.

FIG. 3 is a block diagram illustrating a function configuration of the communication apparatus 100.

A data amount acquisition unit 301 acquires the data amount of data to be transmitted to each STA stored in an AP and acquires the data amount of data to be transmitted from each STA to the AP in the network. When the communication apparatus 100 acquires the data amount from each STA, the communication apparatus 100 first transmits a request frame to each STA to request it to notify the communication apparatus 100 of the data amount of data stored in each STA. Upon reception of the request frame, each STA notifies the communication apparatus 100 of the data amount of data addressed to the AP stored in each STA, by using BSR Frame as a notification frame. The communication apparatus 100 acquires the data amount of data addressed to the AP stored in each STA, from received BSR Frame.

The transmission rate acquisition unit 302 acquires MCS and Nss applicable to communication with each STA and, based on the acquired MCS and Nss, acquires the transmission rate. Applicable MCS and Nss are determined based on the communication quality in communication with each STA. The communication apparatus 100 performs the following transmission rate acquisition processing. First of all, the communication apparatus 100 acquires Received Signal Strength Indication (RSSI) in communication with each STA as information about the communication quality. Alternatively, the communication apparatus 100 acquires Signal-to-Noise Ratio (SNR) in communication with each STA as information about the communication quality. Then, referring to a prestored table indicating the correspondence between these pieces of information and MCS and Nss, the communication apparatus 100 acquires applicable MCS and Nss based on these pieces of acquired information. The communication apparatus 100 further calculates the transmission rate based on acquired MCS and/or Nss. Alternatively, the communication apparatus 100 may acquire the transmission rate with reference to the pre-stored table associating MCS and/or Nss with the transmission rate. By performing such processing, the transmission rate in communication between the communication apparatus 100 and each STA is acquired.

For example, when the communication apparatus 100 determines MCS and Nss based on RSSI, the communication apparatus 100 pre-stores a table indicating MCS and Nss applicable to the acquired RSSI values. When the communication apparatus 100 acquires RSSI in communication with a certain STA, the communication apparatus 100 refers to the pre-stored table to acquire MCS and Nss applicable to communication with the STA. Likewise, the communication apparatus 100 acquires the transmission rate based on acquired MCS and/or Nss.

The communication apparatus 100 performs transmission rate acquisition processing at preset predetermined intervals. The interval at which the communication apparatus 100 performs transmission rate acquisition processing may be preset in the communication apparatus 100 or set by the user. The communication apparatus 100 may determine MCS and Nss by using a combination of RSSI and SNR.

A communication time calculation unit 303 calculates the communication time in communication with each STA based on the data amount acquired by the data amount acquisition unit 301 and the transmission rate acquired by the transmission rate acquisition unit 302. In communication of the same amount of data, a high transmission rate setting provides a shorter communication time and a lower resistance to error than a low transmission rate setting. On the other hand, a low transmission rate setting provides a longer communication time and a higher resistance to error than a high transmission rate setting.

A transmission rate setting unit 304 sets the transmission rate in communication with each STA based on the communication time in communication with each STA calculated by the communication time calculation unit 303 and the transmission rate applicable to communication with each STA acquired by the transmission rate acquisition unit 302. More specifically, the transmission rate setting unit 304 sets the transmission rate in communication with other STAs to a transmission rate providing a high resistance to error, i.e., to a low transmission rate so that the communication time does not exceed the maximum communication time out of the communication times calculated by the communication time calculation unit 303. When setting the transmission rate in communication with other STAs to a low transmission rate, the communication apparatus 100 sets MCS to be used in communication with other STAs to MCS indicating a low coding rate or a modulation method that can transmit a small amount of information with one symbol. Alternatively, instead of or in addition to the MCS setting, the communication apparatus 100 sets Nss to be used in communication with other STAs to Nss indicating the small number of spatial streams.

It can be said that the transmission rate setting unit 304 sets the transmission rate to minimize the difference between the maximum communication time and other communication times. Cases where the transmission rate is set to minimize the difference between the maximum communication time and other communication times include a case where the transmission rate is set to equalize the maximum communication time and other communication time (i.e., to zero the difference therebetween).

The transmission rate set by the transmission rate setting unit 304 is lower than or equal to the transmission rate acquired by the transmission rate acquisition unit 302.

Figure 4:
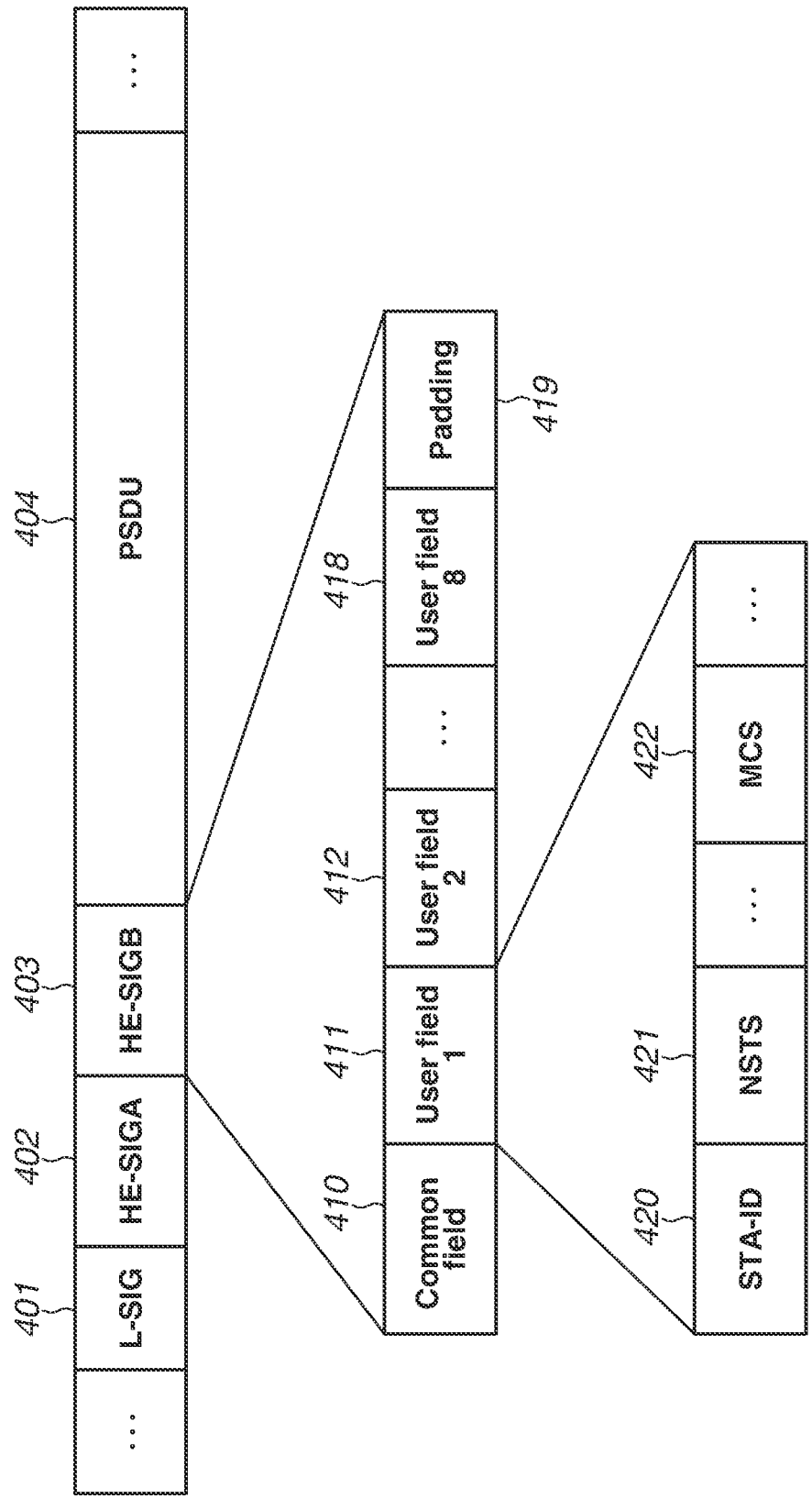
FIG. 4 is a diagram illustrating a frame configuration of HE MU PPDU transmitted by the communication apparatus.

FIG. 4 illustrates a frame configuration of HE MU PPDU transmitted by the communication apparatus 100.

When the communication apparatus 100 determines the transmission rate of data addressed to each STA in DL-OFDMA communication, the communication apparatus 100 stores information about the transmission rate in a HE Preamble in HE MU PPDU including DL-OFDMA communication data and notifies each STA of the information. Information based on the communication time common to all STAs as destinations in HE MU PPDU is set in an L-SIG field 401. Each STA can acquire the communication time common to all STAs by referring to the L-SIG field 401.

When the transmission time of data addressed to each STA is shorter than the communication time common to all STAs, the communication apparatus 100 adds padding data to equalize the transmission time in data transmission to all STAs. User fields 411 to 418 included in HE-SIGB 403 include information indicating the transmission rate of data addressed to each STA. Data for each STA is stored in a PHY Service Data Unit (PSDU) 404.

STA-ID 420 included in the User field 411 is information for identifying the STA to which the data is to be transmitted. A Number of Total Space Time Streams (NSTS) 421 indicates the maximum value of the number of spatial streams in MIMO communication. A Modulation and Coding Scheme (MCS) 422 indicates the identifier of the coding rate and the modulation method.

Figure 5:
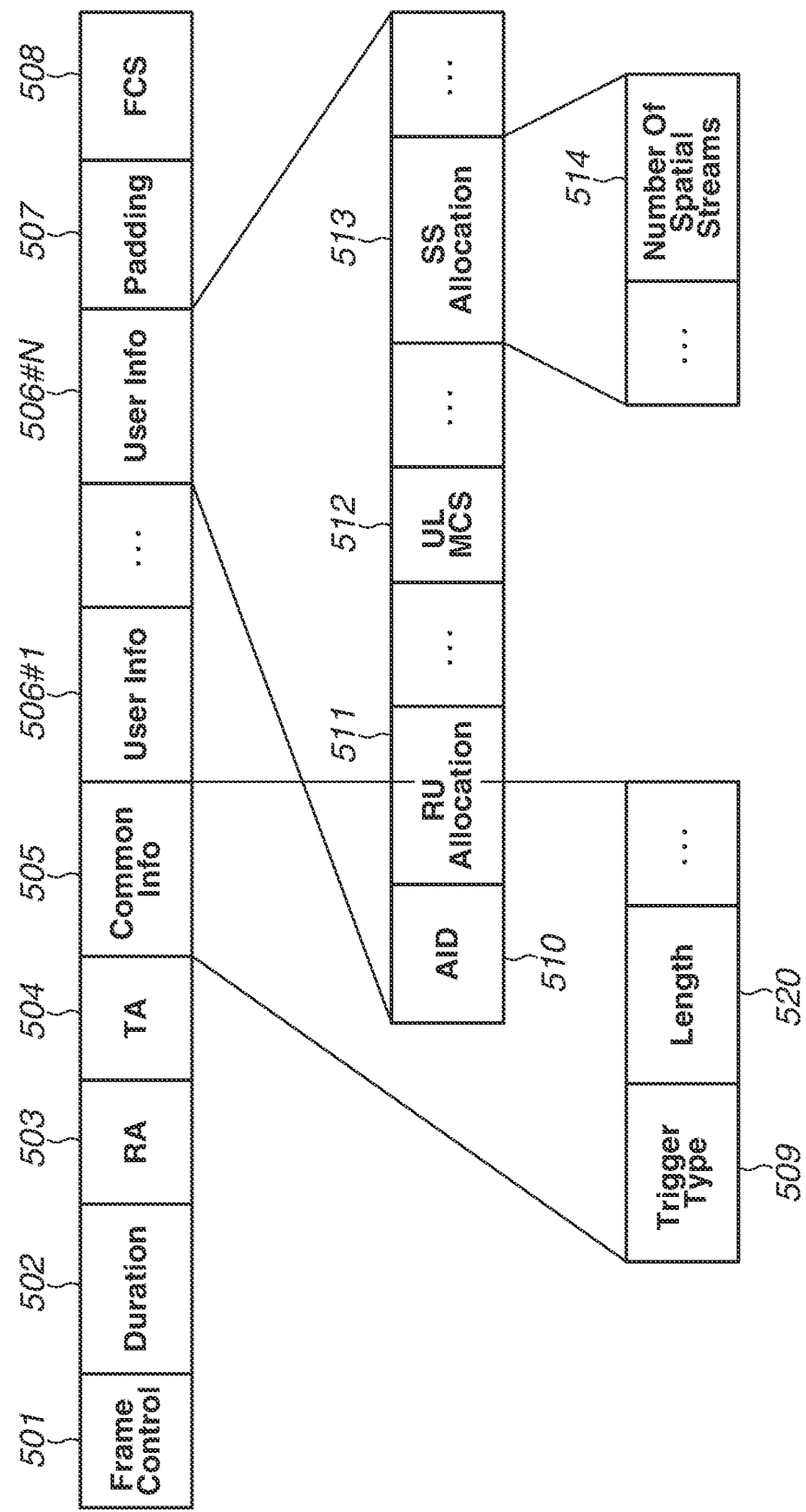
FIG. 5 is a diagram illustrating a frame configuration of Trigger Frame transmitted by the communication apparatus.

FIG. 5 illustrates a frame configuration of a Trigger Frame (TF) transmitted by the communication apparatus 100. Upon reception of a BSR Frame from each STA as a notification frame for notifying the communication apparatus 100 of the data amount of data addressed to an AP stored in each STA, the communication apparatus 100 determines the transmission rate for each STA in UL-OFDMA communication based on the received information. Then, the communication apparatus 100 transmits a TF as a notification frame for prompting UL-OFDMA communication to each STA. The communication apparatus 100 transmits TF on a broadcast basis.

Information common to all STAs is included in Common Info 505 of a TF. More specifically, information based on the communication time common to all STAs is set in Length 520 included in Common Info 505. Upon reception of a TF, each STA achieves data transmission for the communication time specified in Length 520 by adding padding data to the transmission data when the data transmission time of each STA is shorter than the communication time indicated in Length 520.

Each of User Info 506 #1 to 506 #N includes Association ID (AID) 510 as the STA identifier, and RU Allocation 511 for identifying RU assigned to each STA distinguished by AID 510 and a Tone size. AID is the identifier of each STA connected to the network built by the communication apparatus 100. RU refers to a non-overlapping part of the 20-MHz frequency bandwidth. Tone size is a value indicating the RU size which can be assigned to each STA.

Figure 6:
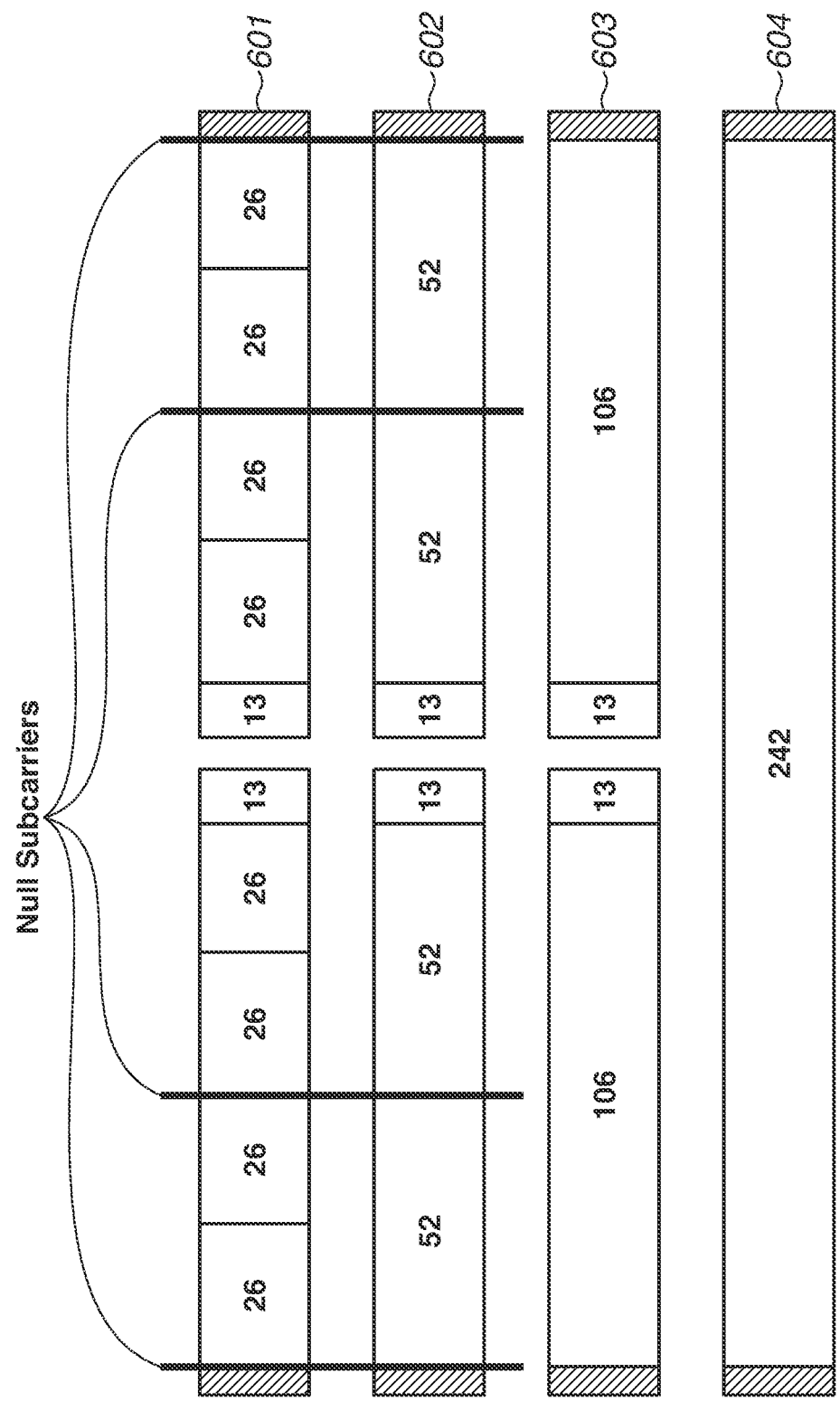
FIG. 6 is a diagram illustrating examples of Tone sizes and sizes of assigned Resource Unit (RU) in a 20-MHz bandwidth.

FIG. 6 illustrates examples of Tone sizes and sizes of assigned RU in the 20-MHz bandwidth. FIG. 6 illustrates a case where the communication apparatus 100 performs RU assignment in the 20-MHz bandwidth. A bar 601 indicates the RU size when RU is assigned to nine STAs. In this case, the communication apparatus 101 assigns RU with Tone size=26 to each STA. Bars 602, 603, 604 indicate the RU size when RU is assigned to five, three, and one STA, respectively. The communication apparatus 100 can also assign Tone size in 40 MHz and 80 MHz in a similar way.

Referring back to FIG. 5, a TF will be described again. Each of User Info 506 #1 to 506 #N also includes UL MCS 512 indicating the identifier of the coding rate and the modulation method. UL MCS 512 is a field indicating MCS index when the communication apparatus 100 performs UL communication with the STA indicated by AID 510. Number of Spatial Streams 514 included in SS Allocation 513 indicates the number of spatial streams in MIMO communication.

First, a case where the communication apparatus 100 performs DL-OFDMA communication with each STA will be described.

In DL-OFDMA communication, the communication apparatus 100 (AP) stores transmission data addressed to each STA, and the AP transmits the data to each STA. In this case, the communication apparatus 100 sets the transmission rate in DL-OFDMA communication with each STA based on the data amount of transmission data addressed to each STA stored in the communication apparatus 100.

FIG. 7 illustrates examples of STA management information used in DL-OFDMA communication stored in the communication apparatus 100. As STA management information 700, the communication apparatus 100 stores AID 701 as the identifier of each STA, a transmission data amount 702 addressed to each STA, MCS index 703, Nss 704, and a communication time 705.

AID (Association ID) 701 is the identifier of each STA connected to the network built by the communication apparatus 100. In the present exemplary embodiment, two STAs are connected to the communication apparatus 100. The transmission data amount 702 indicates the amount of data to be transmitted from the communication apparatus 100 to each STA.

MCS index 703 indicates the identifier of the coding rate and the modulation method applied based on the communication quality in communication between the communication apparatus 100 and each STA. More specifically, MCS index=1 indicates the Quadrature Phase Shift Keying (QPSK) modulation method and a coding rate of ½. MCS index=3 indicates the 16-position Quadrature Amplitude Modulation (16QAM) method and a coding rate of ½. Nss 704 indicates the number of spatial streams in MIMO communication applied based on the communication quality in communication with each STA. By receiving data in UL-OFDMA communication, the communication apparatus 100 can measure the communication quality (RSSI or SNR) in communication between the communication apparatus 100 and each STA.

When the transmission data amount 702, MCS index 703, and Nss 704 have been determined, the communication apparatus 100 can calculate the communication time 705 in communication with each STA. For example, when the communication apparatus 100 transmits data with the transmission data amount=1, MCS index=1, and Nss=1 to an STA with AID=1, a 16-ms communication time is required. On the other hand, when the communication apparatus 100 transmits data with the same transmission data amount, MCS index=3, and NSS=2 to an STA with AID=2, a 4-ms communication time, which is one fourth of the above-described communication time of 16 ms, is required. In this way, the communication time in communication with each STA is determined by the data amount of data to be communicated with each STA and the transmission rate based on the coding rate, the modulation method, and the number of spatial streams.

Figure 9:
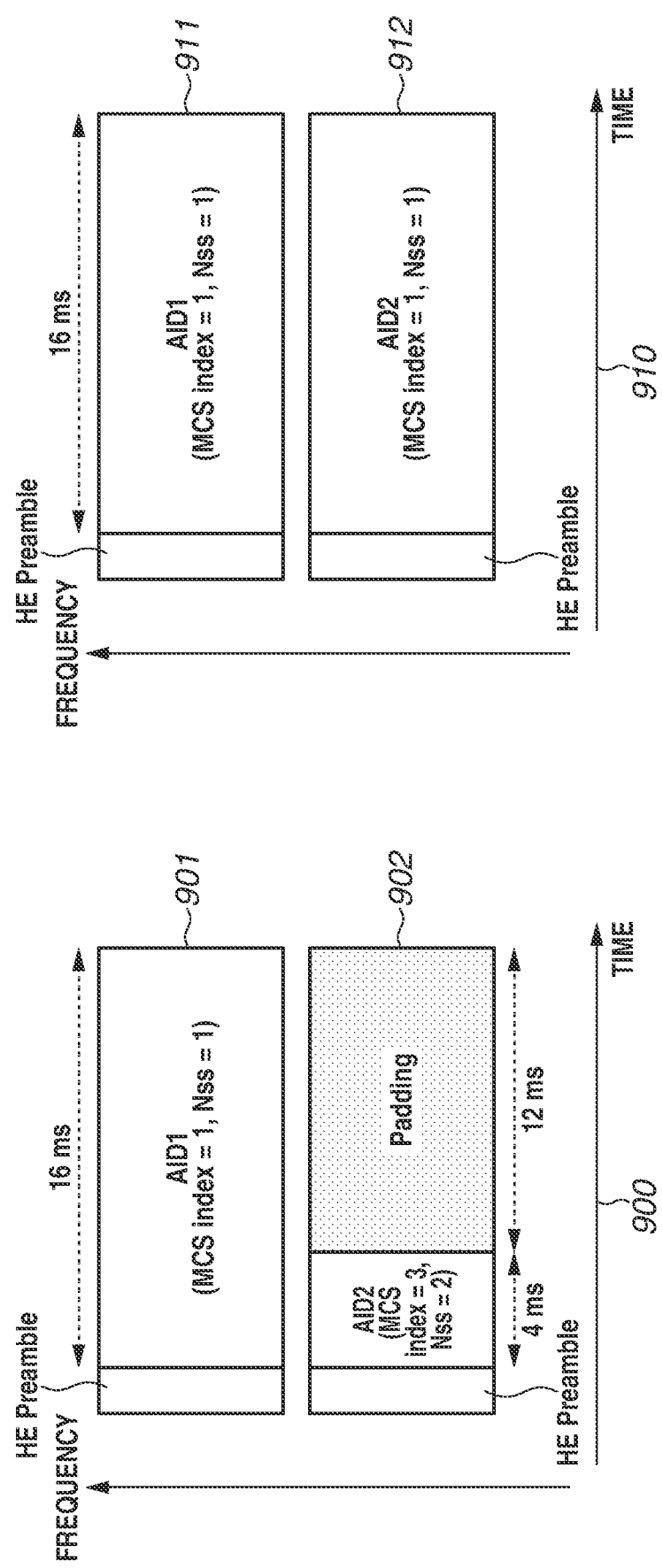
FIG. 9 is a diagram illustrating examples of communication frame configurations used by the communication apparatus in DL-OFDMA communication.

FIG. 9 illustrates examples of communication frame configurations used by the communication apparatus 100 in DL-OFDMA communication. A frame configuration 900 is used when the communication apparatus 100 performs DL-OFDMA communication based on the STA management information 700 illustrated in FIG. 7. Referring to FIG. 9, the horizontal axis indicates time and the vertical axis indicates the frequency.

The communication apparatus 100 transmits a data frame 901 addressed to an STA with AID=1 and a data frame 902 addressed to an STA with AID=2 through DL-OFDMA communication. HE Preamble in HE MU PPDU includes the communication time in communication with each STA and information about MCS index and Nss in communication with each STA. As indicated by the STA management information 700 illustrated in FIG. 7, the communication apparatus 100 sets MCS index=1 and Nss=1 for the STA with AID=1 and requires a 16-ms communication time in communication with the STA with AID=1. On the other hand, the communication apparatus 100 sets MCS index=3 and Nss=2 for the STA with AID=2 and requires a 4 ms communication time in communication with the STA with AID=2. Therefore, to equalize the communication time of the STA with AID=1 and the STA with AID=2, the communication apparatus 100 adds padding data for the remaining 12 ms at the end of the transmission data and transmits the data to the STA with AID=2. In this way, the communication apparatus 100 will transmit useless padding data (empty data) in communication with the STA with AID=2.

Figure 8:
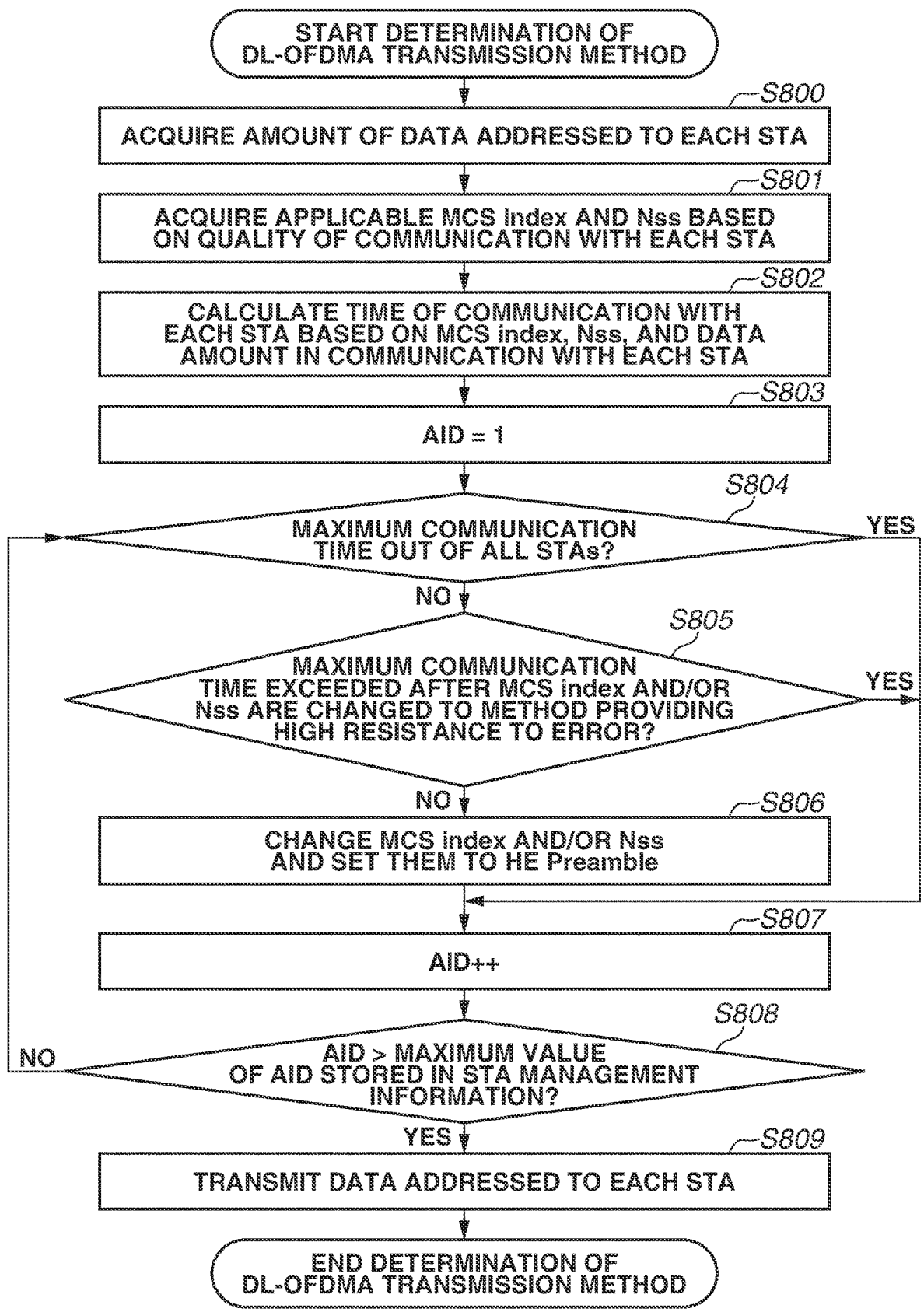
FIG. 8 is a flowchart illustrating processing performed by the communication apparatus in DL-OFDMA communication.

FIG. 8 is a flowchart illustrating processing performed by the communication apparatus 100 in DL-OFDMA communication according to the present exemplary embodiment. This flowchart is started when the communication apparatus 100 as an AP receives high-priority data addressed to a STA connected to the network built by the communication apparatus 100. Examples of high-priority data include data with Access Category (AC) as an Enhanced Distributed Channel Access (EDCA) parameter being set to Voice (VO). EDCA parameters indicate the priority of data and include VO, Video (VI), Best Effort (BE), and Back Ground (BK) having higher priority in this order.

Alternatively, this flowchart may be started when the communication apparatus 100 receives data with an emergency or urgency flag being set, addressed to each STA connected to the network built by the communication apparatus 100. Alternatively, this flowchart may be started when the data amount of accumulated data addressed to a certain STA, out of a plurality of STAs connected to the network built by the communication apparatus 100, reaches or exceeds a predetermined threshold value. Alternatively, this flowchart may be started when the data amount of the entire data addressed to all STAs connected to the network built by the communication apparatus 100 reaches or exceeds a predetermined threshold value. Alternatively, this flowchart may be started by the communication apparatus 100 at predetermined intervals. In that case, the communication apparatus 100 may not start this flowchart if the communication apparatus 100 stores no data addressed to STAs.

In S800, the communication apparatus 100 acquires the data amount of data addressed to each STA. More specifically, the communication apparatus 100 acquires the data amount of data addressed to each STA accumulated in a transmission buffer of the communication apparatus 100.

In S801, the communication apparatus 100 acquires MCS index and Nss applicable to communication with each STA based on the communication quality (RSSI or SNR) in communication with each STA. More specifically, the communication apparatus 100 performs transmission rate acquisition processing via the transmission rate acquisition unit 302. When the communication apparatus 100 has already acquired the transmission rate in communication with each STA and when a predetermined time period has not elapsed since the last transmission rate acquisition processing is completed, S801 may be skipped and the processing proceeds to S802 in which the communication apparatus 100 may perform the processing by using the last acquired transmission rate. When the acquisition of MCS index and Nss is necessary for a plurality of STAs, the communication apparatus 100 performs processing for acquiring MCS index and Nss for the necessary number of STAs.

In S802, the communication apparatus 100 calculates the communication time in communication with each STA based on the transmission data amount addressed to each STA acquired in S800 and the transmission rate based on MCS index and Nss acquired in S801.

Then, the communication apparatus 100 performs determination processing for setting the transmission rate based on the communication time. In S803, to perform the determination processing from the STA with AID=1, the communication apparatus 100 sets the STA with AID=1 as the STA to be subjected to the determination processing.

In S804, the communication apparatus 100 determines whether the communication time of the STA with currently set AID is the maximum communication time out of all STAs. When the communication apparatus 100 determines that the communication time of the STA with the currently set AID is the maximum communication time out of all STAs (YES in S804), the processing proceeds to S807. On the other hand, when the communication apparatus 100 determines that the communication time of the STA with the currently set AID is not the maximum communication time (NO in S804), the processing proceeds to S805.

In S805, the communication apparatus 100 determines whether the communication time in communication with the STA with the currently set AID exceeds the maximum communication time when MCS index and/or Nss in communication with the STA with the currently set AID are changed to a method providing a high resistance to error. The communication apparatus 100 can improve the resistance to error by changing MCS index and/or Nss in communication with the STA with the currently set AID to a method providing a low transmission rate. However, after MCS index and/or Nss are changed to a method providing a low transmission rate, the communication time prolongs compared to that before the change. Therefore, by preventing the communication time after the change from exceeding the maximum communication time, the communication time of the entire DL-OFDMA communication can be effectively used while improving the resistance to error.

More specifically, the communication apparatus 100 decrements by one the value of either one of MCS index and Nss in communication with the STA with the currently set AID and calculates the communication time at the transmission rate after the change. When the calculated communication time does not exceed the maximum communication time, the communication apparatus 100 decrements by one the value of either one of MCS index and Nss again and compares the communication time at the transmission rate after the change with the maximum communication time. When the communication time at the transmission rate after the change exceeds the maximum communication time, the communication apparatus 100 sets MCS index and Nss before the change at that timing to MCS index and Nss to be set in S806 (described below). When neither MCS index nor Nss acquired in S801 can be changed, the communication apparatus 100 determines that the result of the processing in S805 is YES.

For example, to perform the determination in S805 for the STA with AID=2, the communication apparatus 100 decrements by one the value of either one of MCS index and Nss acquired in S801. Which one of the values of MCS index and Nss is to be changed first may be preset by the communication apparatus 100 or selected by the user. The transmission rate acquired in S801 is assumed to be based on MCS index=3 and Nss=2, as illustrated in the STA management information 700. If the communication apparatus 100 is a communication apparatus that decrements the value of MCS index first, the communication apparatus 100 sets the transmission rate in communication with the STA with AID=2 based on MCS index=2 and Nss=2. The communication apparatus 100 calculates the communication time in communication with the STA with AID=2 by using the transmission rate after the change (MCS index=2, Nss=2). When the calculated communication time exceeds the maximum communication time, the communication apparatus 100 determines that the result of the processing in S805 is NO. On the other hand, when the calculated communication time does not exceed the maximum communication time, the communication apparatus 100 further decrements by one MCS index or Nss in communication with the STA with AID=2. If MCS index changed first has not become the minimum value in this case, the communication apparatus 100 may continuously change MCS index or change the value of Nss. In this case, the communication apparatus 100 continuously changes the value of MCS index. The communication apparatus 100 calculates the communication time in communication with the STA with AID=2 by using the further changed transmission rate (MCS index=1, Nss=2) in communication with the STA with AID=2. When the calculated communication time does not exceed the maximum communication time, the communication apparatus 100 further decrements by one MCS index or Nss in communication with the STA with AID=2 and performs similar processing. On the other hand, when the calculated communication time exceeds the maximum communication time, the communication apparatus 100 sets MCS index and Nss before the change at that timing (MCS index=2, Nss=2) to MCS index and Nss to be set in S806 (described below). Then, the communication apparatus 100 determines that the result of the processing in S805 is NO.

Alternatively, in S805, MCS index and Nss after the change may be preset by the communication apparatus 100 or set by the user. For example, the communication apparatus 100 may be preset to calculate the communication time when MCS index and Nss corresponding to the lowest transmission rate are (MCS index=1, Nss=1) set and perform the determination in S805.

When the communication apparatus 100 determines that the communication time in communication with MCS index and/or Nss after the change exceeds the maximum communication time (YES in S805), the processing proceeds to S807. When the communication apparatus 100 determines that the result of the processing in S805 is YES, the communication apparatus 100 does not change MCS index and Nss in communication with the STA with the set AID. On the other hand, when the communication apparatus 100 determines that the communication time in communication with MCS index and/or Nss after the change does not exceed the maximum communication time (NO in S805), the processing proceeds to S806.

In S806, the communication apparatus 100 changes MCS index and/or Nss in communication with the STA with the set AID and sets MCS index and Nss after the change to HE Preamble in HE MU PPDU. In this case, the communication apparatus 100 sets MCS index and/or Nss with which the communication time is determined not to exceed the maximum communication time in the determination in S805. Alternatively, the communication apparatus 100 may set MCS index or Nss providing a higher transmission rate than MCS index or Nss used in the determination in S805. The transmission rate based on MCS index or Nss newly set in S806 provides a lower transmission rate and a higher resistance to error than the transmission rate and resistance to error based on MCS index or Nss set before the determination.

In S807, the communication apparatus 100 increments the set AID to perform the determination processing for the next STA.

In S808, the communication apparatus 100 determines whether the set AID exceeds the maximum value of AID stored as the STA management information. When the communication apparatus 100 determines that the set AID exceeds the maximum value of AID stored as the STA management information (YES in S808), the processing proceeds to S809. On the other hand, when the communication apparatus 100 determines that the set AID does not exceed the maximum value of AID stored as the STA management information (NO in S808), the processing returns to S804.

In S809, the communication apparatus 100 transmits data to each STA. In this case, the communication apparatus 100 performs the processing in S806 and then transmits data to the STA with the changed transmission rate, at the transmission rate based on MCS index and Nss after the change. The communication apparatus 100 transmits data by using HE MU PPDU illustrated in FIG. 4. When the communication apparatus 100 completes the processing in S809, the communication apparatus 100 ends this flowchart.

The communication apparatus 100 can effectively use a communication band by changing MCS index and/or Nss to be used in communication with a STA not having the maximum communication time to a method providing a high resistance to error within a range where the maximum communication time is not exceeded, as illustrated in FIG. 8. If MCS index and/or Nss to be used in communication with a certain STA are changed to a method providing a higher resistance to error, the transmission rate decreases to increase the communication time in communication with the STA. However, in DL-OFDMA communication, in order for all STAs to perform communication according to the maximum communication time, the communication apparatus 100 transmits data with a short communication time with added padding data. According to the present exemplary embodiment, if the communication apparatus 100 sets MCS index or Nss providing a low transmission rate in communication with a STA having a short communication time, the communication apparatus 100 can improve the resistance to error without adding padding data. This enables the communication apparatus 100 to effectively use a communication band in performing DL-OFDMA communication.

Referring to FIG. 7, STA management information 710 is an example of a result of performing the processing illustrated in FIG. 8 on the STA management information 700. According to the present exemplary embodiment, since the 16-ms communication time in communication with the STA with AID=1 is the maximum communication time, the communication apparatus 100 examines the change of MCS index and/or Nss in communication with a STA not with AID=1 (in this case, a STA with AID=2). As a result of the communication apparatus 100 performing the processing illustrated in FIG. 8, when the communication apparatus 100 determines that the maximum communication time is not exceeded even after MCS index and Nss are changed to MCS index=1 and Nss=1 to decrease the transmission rate in communication with a communication apparatus with AID=2, the communication apparatus 100 changes MCS index and Nss. With this change, the transmission rate in communication between the communication apparatus 100 and the STA with AID=2 is changed, the communication time is prolonged to 16 ms but the resistance to error of transmission data is improved. FIG. 9 illustrates a frame configuration 910 after the communication apparatus 100 performs the processing illustrated in FIG. 8 to change the transmission rate. As a result that the communication apparatus 100 changes the transmission rate in communication with the STA with AID=2, the communication time in communication with the STA with AID=2 becomes 16 ms. Accordingly, the need of adding padding data in data transmission to the STA with AID=2 is eliminated. This enables the communication apparatus 100 to effectively use a communication band without transmitting empty data, i.e., by transmitting the transmission data with an improved resistance to error. If the communication time is shorter than the maximum communication time even after the transmission rate is changed, the communication apparatus 100 adds a necessary amount of padding data. Also, in this case, the communication apparatus 100 transmits empty data for a shorter transmission time than the transmission time before the transmission rate is changed. As a result, since the communication apparatus 100 can transmit the transmission data with an improved resistance to error, a communication band can be effectively used.

In the above-described DL-OFDMA communication, the communication apparatus 100 as an AP suitably sets the transmission rate in communication with each STA in consideration of the maximum communication time, a communication band can be effectively used.

Subsequently, an example in which the communication apparatus 100 performs UL-OFDMA communication with each STA will be described below.

In UL-OFDMA communication, each STA stores transmission data addressed to the communication apparatus 100 (AP) and transmits data to the AP. In this case, based on the data amount of transmission data stored in each STA notified from each STA to the communication apparatus 100, the communication apparatus 100 determines the transmission rate in UL-OFDMA communication with each STA.

FIG. 10 illustrates tables illustrating examples of the STA management information in UL-OFDMA communication stored in the communication apparatus 100. As the STA management information 1000, the communication apparatus 100 stores AID as the identifier of each STA, the data amount of transmission data addressed to an AP stored in each STA, MCS index and Nss, and the communication time. AID, MCS index, and Nss are similar to those illustrated in FIG. 7. Upon reception of BSR Frame from each STA, the communication apparatus 100 acquires the data amount of transmission data addressed to the AP stored in each STA and stores the data amount as the STA management information 1000.

Figure 12:
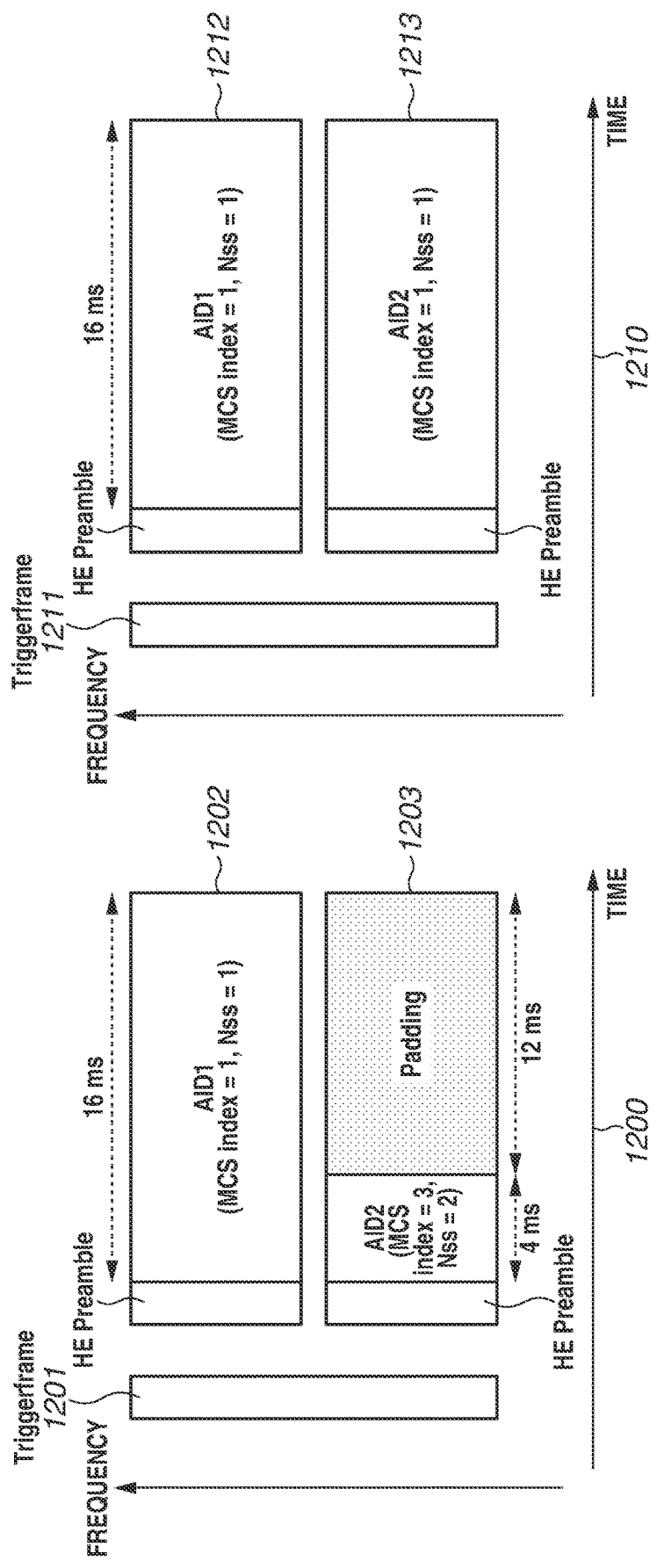
FIG. 12 is a diagram illustrating examples of communication frame configurations used by the communication apparatus in UL-OFDMA communication.

FIG. 12 illustrates examples of communication frame configurations when the communication apparatus 100 performs UL-OFDMA communication. A frame configuration 1200 is used when the communication apparatus 100 performs UL-OFDMA communication based on the STA management information 1000 illustrated in FIG. 10. In FIG. 12, the horizontal axis indicates time and the vertical axis indicates the frequency.

Trigger Frame (TF) 1201 includes the communication time in UL-OFDMA communication and information about MCS index and Nss in communication with each STA. Upon reception of TF, each STA performs UL-OFDMA communication with the communication apparatus 100 and transmits data to the communication apparatus 100. FIG. 12 illustrates a data frame 1202 for UL-OFDMA communication transmitted by a STA with AID=1, and a data frame 1203 for UL-OFDMA communication transmitted by a STA with AID=2. For the STA with AID=1, the communication apparatus 100 specifies MCS index=1 and Nss=1 through TF. For the STA with AID=2, the communication apparatus 100 specifies MCS index=3 and Nss=2 through TF. For each STA, the communication apparatus 100 specifies a 16-ms communication time in UL-OFDMA communication through TF. The STA with AID=1 transmits data to the AP by using all of the specified communication time, while the STA with AID=2 transmits data to the AP by using a 4-ms communication time. In this case, the STA with AID=2 will transmit padding data (empty data) for the remaining 12-ms communication time.

Figure 11:
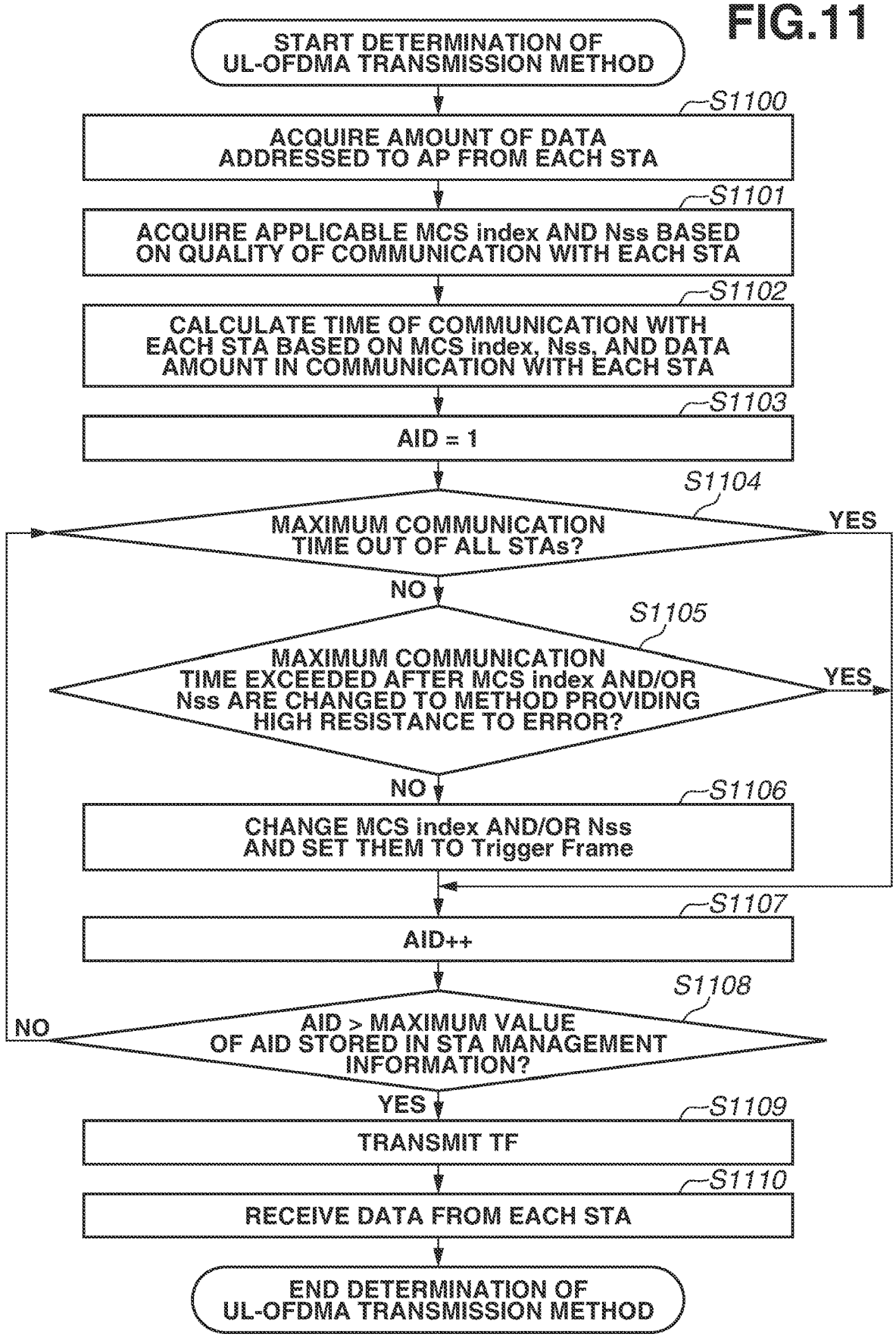
FIG. 11 is a flowchart illustrating processing performed by the communication apparatus in UL-OFDMA communication.

FIG. 11 is a flowchart illustrating processing performed by the communication apparatus 100 in UL-OFDMA communication according to the present exemplary embodiment. The communication apparatus 100 starts this flowchart at predetermined intervals. Alternatively, the communication apparatus 100 may start this flowchart upon reception of BSR Frame from the STA before the communication apparatus 100 transmits BSR Poll. In this case, in S301 (described below), the communication apparatus 100 can acquire the data amount of data addressed to an AP, from BSR Frame.

In S1100, the communication apparatus 100 first acquires the data amount of data addressed to the AP (communication apparatus 100), from each STA. More specifically, the communication apparatus 100 first transmits a request frame (BSR Poll) to each STA to request it to notify the communication apparatus 100 of the data amount of data addressed to the AP stored in each STA. Upon reception of the request frame from the AP, each STA transmits BSR Frame to the communication apparatus 100 as a notification frame for notifying the communication apparatus 100 of the data amount of data addressed to the AP accumulated in the transmission buffer of each STA. The communication apparatus 100 acquires the data amount of data addressed to the AP stored in each STA, from BSR Frame received from each STA.

In S1101, the communication apparatus 100 acquires MCS index and Nss applicable to communication with each STA based on the communication quality (RSSI or SNR) in communication with each STA. More specifically, the communication apparatus 100 performs the acquisition processing by the transmission rate acquisition unit 302. When the communication apparatus 100 has already acquired the transmission rate and when a predetermined time period has not elapsed since the last transmission rate acquisition processing is completed, S1101 may be skipped and the processing proceeds to S1102 in which the communication apparatus 100 perform processing by using the last acquired transmission rate. When the acquisition of MCS index and Nss is necessary for a plurality of STAs, the communication apparatus 100 performs processing for acquiring MCS index and Nss for the necessary number of STAs.

In S1102, the communication apparatus 100 calculates the communication time in communication with each STA based on the data amount of transmission data addressed to the AP stored in each STA acquired in S1100 and on the transmission rate based on MCS index and Nss acquired in S1101.

Then, the communication apparatus 100 performs determination processing for setting the transmission rate based on the communication time. In S1103, to perform the determination processing from a STA with AID=1, the communication apparatus 100 sets the STA with AID=1 as the STA to be subjected to the determination processing.

In S1104, the communication apparatus 100 determines whether the communication time of the STA with the currently set AID is the maximum communication time out of all STAs. When the communication apparatus 100 determines that the communication time of the STA with the currently set AID is the maximum communication time out of all STAs (YES in S1104), the processing proceeds to S1107. On the other hand, when the communication apparatus 100 determines that the communication time of the STA with the currently set AID is not the maximum communication time out of all STAs (NO in S1104), the processing proceeds to S1105.

In S1105, the communication apparatus 100 determines whether the communication time in communication with the STA with the currently set AID exceeds the maximum communication time when MCS index and/or Nss in communication with the STA with currently set AID are changed to a method providing a high resistance to error. More specifically, the communication apparatus 100 can improve the resistance to error by changing MCS index and/or Nss in communication with the STA with the currently set AID to a method providing a low transmission rate. However, after MCS index and/or Nss are changed to a method providing a low transmission rate, the transmission rate decreases to increase the communication time compared to that before the change. Accordingly, by preventing the communication time after the change from exceeding the maximum communication time, the communication time of the entire DL-OFDMA communication can be effectively used while improving the resistance to error. Specific processing in S1105 is similar to the processing in S805 illustrated in FIG. 8. When the communication apparatus 100 determines that the communication time in communication with MCS index and/or Nss after the change exceeds the maximum communication time (YES in S1105), the processing proceeds to S1107. When the communication apparatus 100 determines that the result of the processing in S1105 is YES, the communication apparatus 100 does not change MCS index and Nss in communication with the STA with set AID. On the other hand, when the communication apparatus 100 determines that the communication time in communication with MCS index and/or Nss after the change does not exceed the maximum communication time (NO in S1105), the processing proceeds to SI 106.

In S1106, the communication apparatus 100 changes MCS index and/or Nss in communication with the STA with the set AID and sets MCS index and Nss after the change to Trigger Frame. In this case, the communication apparatus 100 sets MCS index and/or Nss with which the communication time is determined not to exceed the maximum communication time in the determination in S1105. Alternatively, the communication apparatus 100 may set MCS index or Nss providing a higher transmission rate than MCS index or Nss used in the determination in S1105. The transmission rate based on MCS index or Nss newly set in SI 106 provides a lower transmission rate and a higher resistance to error than the transmission rate and resistance to error based on MCS index or Nss set before the determination.

In S1107, the communication apparatus 100 increments the set AID to perform the determination processing for the next STA.

In S1108, the communication apparatus 100 determines whether the set AID exceeds the maximum value of AID stored as the STA management information. When the communication apparatus 100 determines that the set AID exceeds the maximum value of AID stored as the STA management information (YES in S1108), the processing proceeds to S1109. On the other hand, when the communication apparatus 100 determines that the set AID does not exceed the maximum value of AID stored as the STA management information (NO in S1108), the processing returns to S1104.

In S1109, the communication apparatus 100 transmits TF to the STA. In this case, the communication apparatus 100 transmits TF on a broadcast basis. The communication apparatus 100 transmits TF including information about the transmission rate after the change (MCS index, Nss) to the STA with which the transmission rate has been changed in S1106. When the communication apparatus 100 completes the processing in S1109, the processing proceeds to S1110.

In S1110, the communication apparatus 100 receives data addressed to the AP from each STA that has received TF. In this case, each STA transmits data to the communication apparatus 100 by using information about the transmission rate indicated in TF transmitted in S1109. In S110, STAs with which corresponding AID is not included in TF transmitted in S1109 do not transmit data to the communication apparatus 100. When the communication apparatus 100 completes the processing in S1110, the communication apparatus 100 ends this flowchart.

As illustrated in FIG. 11, an STA having a short communication time can effectively use a communication band by changing MCS index and/or Nss to be used in communication with a STA not having the maximum communication time to a method providing a high resistance to error within a range where the maximum communication time is not exceeded. If MCS index and/or Nss to be used in communication with a certain STA are changed to a method providing a higher resistance to error, the transmission rate decreases to increase the communication time in communication with the STA. However, in UL-OFDMA communication, all STAs perform communication according to the maximum communication time and therefore a STA having a short communication time transmits data with added padding data. According to the present exemplary embodiment, if the communication apparatus 100 sets MCS index or Nss providing a low transmission rate in communication with the STA having a short communication time, the STA can improve the resistance to error without adding padding data. This enables the STA having a short communication time to effectively use a communication band in UL-OFDMA communication.

In FIG. 10, STA management information 1010 is an example of a result of performing the processing illustrated in FIG. 11I on the STA management information 1000. In the present exemplary embodiment, since the 16-ms communication time in communication with the STA with AID=1 is the maximum communication time, the communication apparatus 100 examines the change of MCS index and/or Nss in communication with an STA not with AID=1 (in this case, a STA with AID=2). As a result of the communication apparatus 100 performing the processing illustrated in FIG. 11, when the communication apparatus 100 determines that the maximum communication time is not exceeded even after MCS index and Nss are changed to MCS index=1 and Nss=1 to decrease the transmission rate in communication with a communication apparatus with AID=2, the communication apparatus 100 changes MCS index and Nss. As a result of the transmission rate in communication between the communication apparatus 100 and the STA with AID=2 being decreased, the communication time is prolonged to 16 ms but the resistance to error of transmission data transmitted from the STA is improved. FIG. 12 illustrates a frame configuration 1210 after the communication apparatus 100 performs the processing illustrated in FIG. 11 to change the transmission rate. By the communication apparatus 100 having changed the transmission rate in communication with the STA with AID=2, the communication time in communication with the STA with AID=2 becomes 16 ms, eliminating the need of adding padding data in data transmission to the STA with AID=2. This enables the STA with AID=2 to effectively use a communication band without transmitting empty data, i.e., by transmitting the transmission data with an improved resistance to error. If the communication time is shorter than the maximum communication time indicated by TF even after the transmission rate is changed by the communication apparatus 100, the STA with AID=2 adds a necessary amount of padding data. Also, in this case, the STA with AID=2 transmits empty data for a shorter transmission time than the transmission time before the transmission rate is changed. As a result, the communication apparatus 100 can transmit the transmission data with an improved resistance to error, and a communication band can be used effectively.

The communication apparatus 100 may be an apparatus capable of performing both or either one of the processing of the flowchart illustrated in FIG. 8 and the processing of the flowchart illustrated in FIG. 11. More specifically, the communication apparatus 100 may change the transmission rate in both or either one of UL-OFDMA communication and DL-OFDMA communication.

Also, the communication apparatus 100 may be a communication apparatus incapable of transmitting a request frame (BSR Frame) for requesting a notification of the data amount to the communication apparatuses 101 and 102. In this case, each STA may be able to transmit BSR Frame without receiving a request frame. Alternatively, the communication apparatus 100 may be an apparatus incapable of performing the processing of the flowchart illustrated FIG. 11.

When changing MCS index, the communication apparatus 100 according to the present exemplary embodiment may change MCS index to change both or either one of the coding rate and the modulation method.

According to the present exemplary embodiment, the communication apparatus 100 improves the resistance to error by changing MCS index and/or Nss in communication with the STA communicated in a communication time shorter than the maximum communication time in communication with each STA, to a method providing a low transmission rate. However, it is not limited thereto. The communication apparatus 100 may improve the use efficiency of a communication band by changing MCS index and Nss in communication with the STA having the maximum communication time to a method providing a high transmission rate to shorten the total communication time in OFDMA communication. In this case, when the set transmission rate is lower than the transmission rate acquired by the transmission rate acquisition unit 302, the communication apparatus 100 can shorten the communication time by changing MCS index and/or Nss to a method providing a high transmission rate.

Although, in the present exemplary embodiment, the communication apparatus 100 as an AP sets the transmission rate in communication with each STA, some embodiments are not limited thereto. An external apparatus wirelessly or wiredly connected with the communication apparatus 100 may set the transmission rate. In this case, instead of or in addition to the AP, the external apparatus can calculate the communication time in communication between the AP and each STA and set the transmission rate. The external apparatus can also acquire various information necessary to perform these pieces of processing from the communication apparatus 100 as an AP. The external apparatus may wirelessly or wiredly connect with each STA. Alternatively, instead of the AP, each STA may calculate the communication time in communication with the AP and set the transmission rate. In this case, each STA can acquire various information necessary to perform these pieces of processing from the AP.

Although, in the present exemplary embodiment, the communication apparatuses 100 to 102 perform wireless communication conforming to the IEEE802.11ax standard, the communication apparatuses 100 to 102 may also perform wireless communication conforming to any one of the IEEE802.11 series standards other than the IEEE802.11ax standard. Alternatively, the communication apparatuses 100 to 102 may perform wireless communication conforming not only to the IEEE802.11 series standards but also to Bluetooth®, NFC, UWB, ZigBee, MBOA, and other wireless communication methods. Alternatively, the communication apparatuses 100 to 102 may perform a communication method conforming not only to the IEEE802.11 series standards but also to a wired LAN and other wired communication methods.

Although, in the present exemplary embodiment, the communication apparatuses 100 to 102 perform OFDMA communication, the communication apparatuses 100 to 102 may perform Frequency Division Multiple Access (FDMA) communication.

At least a part or all of the flowcharts of the communication apparatus 100 illustrated in FIGS. 8 and 11 may be implemented by hardware. When the flowcharts are implemented by hardware, it is useful, for example, to generate, using a Field Programmable Gate Array (FPGA), a dedicated circuit based on a computer program for implementing each operation by using a predetermined compiler, and to use this dedicated circuit. Like a FPGA, it is also useful to generate a Gate Array circuit and implement the flowcharts by hardware. In addition, the flowcharts may be implemented by using an Application Specific Integrated Circuit (ASIC).

Further, each operation of the flowcharts illustrated in FIGS. 8 and 11 may be implemented by a plurality of CPUs or apparatuses.

Although exemplary embodiments have been described above, some embodiments can be embodied, for example, as a system, an apparatus, a method, a program, or a recording medium (storage medium). More specifically, some embodiments are applicable to a system composed of a plurality of apparatuses (e.g., a host computer, an interface device, an imaging apparatus, and a web application) and to an apparatus composed of one device.

Some embodiments can also be achieved when a program for implementing at least one of the functions according to the above-described exemplary embodiments is supplied to a system or apparatus via a network or storage medium, and at least one processor in a computer of the system or apparatus reads and executes the program. Some embodiments can also be achieved by a circuit (for example, an ASIC) for implementing at least one function.

According to various embodiments, a communication apparatus is capable of effectively using a communication band when the communication apparatus parallelly communicates with a plurality of other communication apparatuses by using a frequency band assigned to each of the plurality of other communication apparatuses.

Other Embodiments

Some embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-242177, which was filed on Dec. 26, 2018 and which is hereby incorporated by reference herein in its entirety.

What is claimed is:

1. A communication apparatus that has a communication interface and that is capable of receiving data from a plurality of other communication apparatuses by using a frequency band assigned to each of the plurality of other communication apparatuses by using an Orthogonal Frequency Division Multiple Access (OFDMA) communication method via the communication interface, the communication apparatus comprising:
   at least one memory that stores a set of instructions; and
   at least one processor that executes the set of instructions, the instructions, when executed, causing the communication apparatus to perform operations comprising:
      receiving, via the communication interface, a first notification frame for notifying the communication apparatus of a data amount of first data stored as data to be transmitted from each of the plurality of other communication apparatuses to the communication apparatus;

determining a first communication time based on a data amount of first data indicated by the first notification frame received from a first other communication apparatus included in the plurality of other communication apparatuses;

acquiring, based on a communication quality in communication with a second other communication apparatus included in the plurality of other communication apparatuses, a first transmission rate applicable in a case of communicating with the second other communication apparatus via the communication apparatus;

deriving at least one prediction communication time based on a data amount of first data indicated by the first notification frame received from the second other communication apparatus and the acquired first transmission rate;

in a case where a plurality of prediction communication times are derived, specifying a prediction communication time from among the plurality of prediction communication times that has a small difference from the first communication time and does not exceed the first communication time and setting a transmission rate corresponding to the specified prediction communication time as a second transmission rate for the second other communication apparatus to transmit second data; and in a case where the communication apparatus receives data from two or more other communication apparatuses including the second other communication apparatus in parallel by using the OFDMA communication method, performing control so that the second data that is transmitted from the second other communication apparatus is received at the set second transmission rate.

2. The communication apparatus according to claim 1, wherein the second transmission rate corresponding to the specified prediction communication time has higher error resistance than other transmission rate corresponding to other prediction communication time that does not exceed the first communication time among the plurality of prediction communication times.

3. The communication apparatus according to claim 1, wherein the communication quality is Received Signal Strength Indication (RSSI), Signal-to-Noise Ratio (SNR), or a combination of both in communication with the second other communication apparatus.

4. The communication apparatus according to claim 1, wherein the first transmission rate and the second transmission rate are determined based on a coding rate or a modulation method, and wherein the second transmission rate is determined based on a coding rate or a modulation method, and the at least one prediction communication time is derived based on the data amount of first data indicated by the first notification frame received from the second other communication apparatus and a coding rate and/or a modulation method which provide a smaller amount of information that can be transmitted with one symbol than the amount of information that can be transmitted with one symbol by the coding rate or the modulation method for the first transmission rate.

5. The communication apparatus according to claim 1, wherein the first and the second transmission rates are determined based on the number of spatial streams, and wherein the at least one prediction communication time is derived based on the data amount of first data indicated by the first notification frame received from the second other communication apparatus and the smaller number of spatial streams than the number of spatial streams for the first communication time.

6. The communication apparatus according to claim 1, wherein the first notification frame is Buffer Status Report (BSR) Frame conforming to Institute of Electrical and Electronics Engineers (IEEE) 802.11series standard.

7. The communication apparatus according to claim 1, wherein the operations further comprising transmitting a request frame, to each of the plurality of other communication apparatuses, to request each apparatus to notify the communication apparatus of the data amount of first data stored as data to be transmitted to the communication apparatus, wherein the communication apparatus receives the first notification frame as a response to the request frame via the communication interface.

8. The communication apparatus according to claim 7, wherein the request frame is BSR Poll conforming to Institute of Electrical and Electronics Engineers (IEEE) 802.11 series standard.

9. The communication apparatus according to claim 1, wherein the operations further comprising transmitting, to the second other communication apparatus, a second notification frame for notifying the communication apparatus of information about the second transmission rate so that the second data is transmitted from the second other communication apparatus at the second transmission rate.

10. The communication apparatus according to claim 9, wherein the second notification frame is Trigger Frame (TF) conforming to Institute of Electrical and Electronics Engineers (IEEE) 802.11 series standard.

11. The communication apparatus according to claim 1, wherein the (OFDMA) communication method is communication method conforming to Institute of Electrical and Electronics Engineers (IEEE) 802.11 series standard.

12. A method for performing communication between a first communication apparatus and a second communication apparatus, the method comprising:

performing communication between a plurality of other communication apparatuses, including the second communication apparatus, and the first communication apparatus by using a frequency band assigned to each of the plurality of other communication apparatuses by using an Orthogonal Frequency Division Multiple Access (OFDMA) communication method;

receiving a first notification frame for notifying the first communication apparatus of a data amount of first data stored as data to be transmitted from each of the plurality of other communication apparatuses to the first communication apparatus;

determining a first communication time based on the data amount of first data indicated by the received first notification frame received from a first other communication apparatus included in the plurality of other communication apparatuses;

acquiring, based on a communication quality in communication with a second other communication apparatus included in the plurality of other communication apparatuses, a first transmission rate applicable in a case of communicating with the second other communication apparatus via the first communication apparatus;

deriving at least one prediction communication time based on the data amount of first data indicated by the first notification frame received from the second other communication apparatus and the acquired first transmission rate;

in a case where a plurality of prediction communication times are derived, specifying a prediction communication time from among the plurality of prediction communication times that has a small difference from the first communication time and does not exceed the first communication time and setting a transmission rate corresponding to the specified prediction communication time as a second transmission rate for the second other communication apparatus to transmit second data; and in a case where the first communication apparatus receives data from two or more other communication apparatuses including the second other communication apparatus in parallel by using the OFDMA communication method, performing control so that the second data that is transmitted from the second other communication apparatus is received at the set second transmission rate.

13. A non-transitory computer-readable storage medium storing a computer program for causing a computer to execute a control method of a communication apparatus, the control method comprising:

communicating with a plurality of other communication apparatuses by using a frequency band assigned to each of the plurality of other communication apparatuses by using an Orthogonal Frequency Division Multiple Access (OFDMA) communication method;

receiving a first notification frame for notifying the communication apparatus of a data amount of first data stored as data to be transmitted to the communication apparatus from each of the plurality of other communication apparatuses;

determining a first communication time based on the data amount of first data indicated by the first notification frame received from a first other communication apparatus included in the plurality of other communication apparatuses;

acquiring, based on a communication quality in communication with a second other communication apparatus included in the plurality of other communication apparatuses, a first transmission rate applicable in a case of communicating with the second other communication apparatus via the communication apparatus;

deriving at least one prediction communication time based on the data amount of first data indicated by the first notification frame received from the second other communication apparatus and the acquired first transmission rate;

in a case where a plurality of prediction communication times are derived, specifying a prediction communication time from among the plurality of prediction communication times that has a small difference from the first communication time and does not exceed the first communication time and setting a transmission rate corresponding to the specified prediction communication time as a second transmission rate for the second other communication apparatus to transmit second data; and in a case where the communication apparatus receives data from two or more other communication apparatuses including the second other communication apparatus in parallel by using the OFDMA communication method, performing control so that the second data that is transmitted from the second other communication apparatus is received at the set second transmission rate.

* * * * *